United States Patent [19]

Nogami et al.

[11] Patent Number: 4,962,452
[45] Date of Patent: Oct. 9, 1990

[54] LANGUAGE TRANSLATOR WHICH AUTOMATICALLY RECOGNIZES, ANALYZES, TRANSLATES AND REINSERTS COMMENTS IN A SENTENCE

[75] Inventors: Hiroyasu Nogami; Seiji Miike, both of Yokohama; Kimihito Takeda, Odawara; Shin-ya Amano, Yokohama; Chiaki Aoyama, Nakano, all of Japan

[73] Assignee: Kabushiki Kaisha, Kawasaki, Japan

[21] Appl. No.: 399,437

[22] Filed: Aug. 23, 1989

Related U.S. Application Data

[63] Continuation of Ser. No. 45,592, May 4, 1987, abandoned.

[30] Foreign Application Priority Data

May 8, 1986 [JP] Japan .................. 61-103844

[51] Int. Cl.$^5$ ............................. G06F 15/38
[52] U.S. Cl. ................. 364/419; 364/920.4
[58] Field of Search ............ 364/200, 900, 419

[56] References Cited

U.S. PATENT DOCUMENTS 4,420,817 12/1983 Yoshida ..................... 364/900
4,706,212 11/1987 Toma .......................... 364/419 X

FOREIGN PATENT DOCUMENTS 0012777 7/1980 European Pat. Off. .
0180888 5/1986 European Pat. Off. .
56-145461 11/1981 Japan .
0004479 1/1983 Japan .
0096372 6/1983 Japan .
0055536 3/1984 Japan .
0090270 5/1986 Japan .

OTHER PUBLICATIONS

Bates, M., "The Theory and Practice of Augmented Transition Network Grammers", published in *Natural Language Communication with Computers*, L. Bolc (ed.), New York: Springer, 1987, 191–16.
English language translation of JP 96322 application, filed as U.S. Ser. No. 858,007, May 1, 1986.
"Knowledge Representation and Machine Translation", Susumu Sawai, 2311 Fujitsu-Scientific & Technical Journal, vol. 18 (1982), No. 1, pp. 117–132.

*Primary Examiner*—Clark A. Jablon
*Attorney, Agent, or Firm*—Foley & Lardner, Schwartz, Jeffery, Schwaab, Mack, Blumenthal & Evans

[57] ABSTRACT

A machine translation system is capable of automatically and correctly analyzing a sentence having an inserted comment of a first language by means of a specific dictionary. The dictionary includes a first dictionary in accordance with which the inserted comment is extracted and analyzed and a second dictionary in accordance with which the other portion of the sentence than the inserted comments is analyzed. An analysis of the inserted comment and an analysis of the other portion are combined to obtain an analysis of the overall sentence. The translated sentence in the second language is produced in accordance with the analysis of the sentences which is combined. Furthermore, the translated inserted comment is displayed in a distinguishable manner. Specifically, a symbol for showing the inserted comment is added to the translated inserted comment. The translated sentence is displayed for including the inserted comment with the symbol.

17 Claims, 6 Drawing Sheets

| | INSERTED COMMENT EXTRACTING RULE | | | | ANALYSIS GRAMMAR |
|---|---|---|---|---|---|
| A | , | I | think | ----- | , | E |
| B | , | such | as | ----- | , | B |
| C | — | it | be | ----- | — | E |
| D | , | like | | ----- | , | B |
| E | , | then | ~ed | ----- | , | C |
| F | , | i.e. | | ---------- | , | A |
| G | , | adv | | ---------- | , | D |
| ⋮ | ⋮ | ⋮ | ⋮ | ⋮ | ⋮ |

| A | ANALYSIS GRAMMAR FOR NOUN PHRASE |
|---|---|
| B | ANALYSIS GRAMMAR FOR PREPOSITIONAL PHRASE |
| C | ANALYSIS GRAMMAR FOR VERB PHRASE |
| D | ANALYSIS GRAMMAR FOR ADVERB PHRASE |
| E | ANALYSIS GRAMMAR FOR SENTENCE |
| ⋮ | ⋮ |

FIG. 10
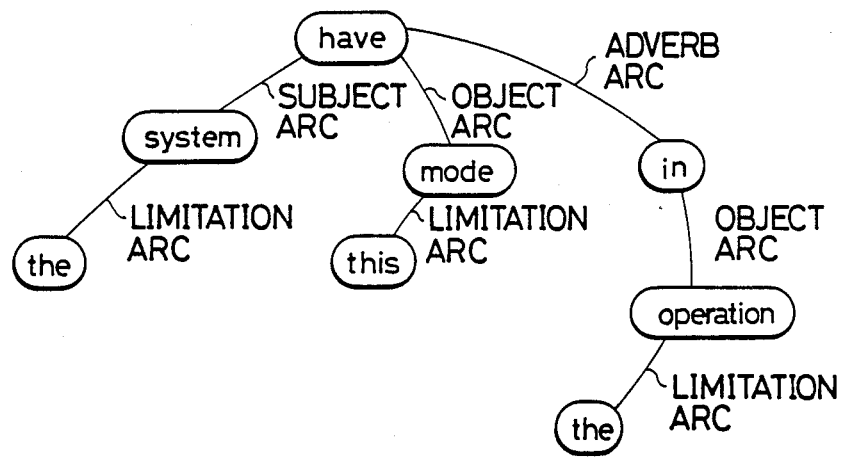
FIG. 11
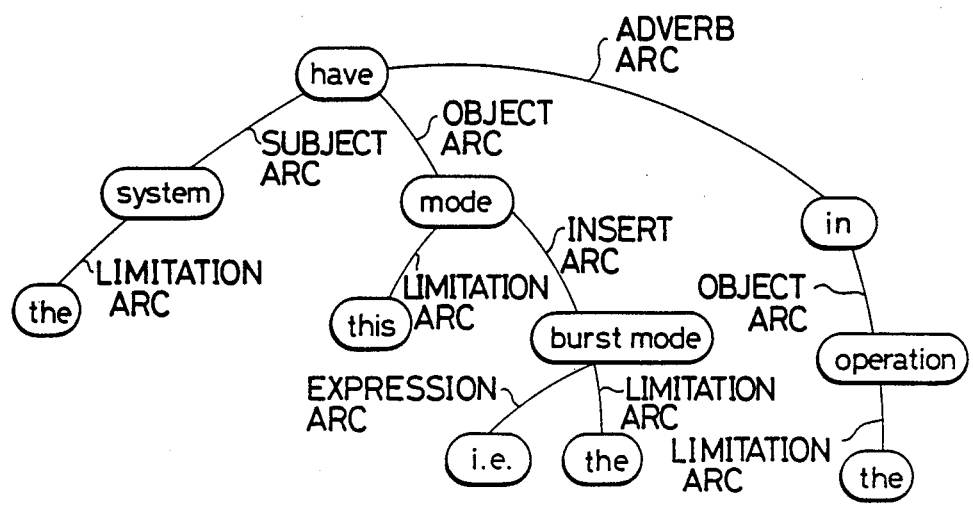
FIG. 12
システムは、操作中に このモード（つまり、バーストモード）を持っている

LANGUAGE TRANSLATOR WHICH AUTOMATICALLY RECOGNIZES, ANALYZES, TRANSLATES AND REINSERTS COMMENTS IN A SENTENCE

This application is a continuation of application Ser. No. 045,592, filed May 4, 1987, now abandoned.

BACKGROUND OF THE INVENTION (1) Field of the Invention

The present invention relates to a machine translation system for translating a first language into a second language, particularly to a machine translation system which is capable of correctly analyzing an inserted comment in a sentence of the first language and displaying the inserted comment translated to the second language in a distinguishable manner.

(2) Description of the Prior Art

Much attention has been paid to automatic machine translation systems which input original documents written in a first language and translate it into a second language by the use of a computer, of late. Basically in these machine translation systems, the input original sentences are analyzed in view of each morpheme and its morphological construction as well as syntax, and divided into predetermined units for processing of words, phrases, or idioms. Then, dictionary or dictionaries for translation are searched and each word is retrieved from the dictionary for every processing unit of the words and phrases thus divided, and when the corresponding words and phrases in the second language, i.e., translated words and phrases are found in the dictionary, they are finally combined in accordance with predetermined translation and grammar rules, thereby obtaining the translated sentences.

However with regard to natural languages, since the analyzing technique is not well established, it is difficult to obtain a suitable translation of the natural languages. One form of the natural languages is an inserted comment. Namely, in the natural languages, the inserted comment such as a noun phrase, a verb phrase, an adverb phrase, a conditional clause, and a sentence etc. are used in sentences very well, therefore, it is difficult to analyze the sentences having the inserted comment. In a known type of machine translation system, the inserted comment is analyzed by enclosing the inserted comment with a mark for implying the insertion. However, the enclosing is carried out by an operator in the prior art system. Namely, the operator has to designate the inserted comment one by one in a pre-edit process, therefore, the designating operation is a troublesome work for the operator. Then, the outputted translation of the inserted comment is displayed in the same configuration as that of the other portion of the sentence Therefore, it is difficult work for the operator to distinguish the translation of the inserted comment.

SUMMARY OF THE INVENTION

It is an object of the present invention to provide an improved machine translation system which is capable of automatically analyzing sentences having inserted comments without the operator's designation work of the inserted comments.

It is another object of the present invention to provide a machine translation system which is capable of establishing an easy discrimination of a translation of an inserted comment.

One feature of the present invention resides in a machine translation system for translating a first language into a second language, which comprises: (a) an input portion (1) having function keys, edit keys, cursor keys for entry of the original written sentences in the first language and for performing various operations for translation, as well as having other alphanumeric keys; (b) a first memory (2) for storing original sentences written in the first languages so as to analyze the original sentences; (c) a second memory (3) for storing translated sentences in the second language as a translation corresponding to the input original sentences in the first language; (d) an edit control portion (4) for controlling the edition, operation of the entire system; (e) a dictionary unit (6) having a first dictionary in accordance with which the inserted comments are extracted and analyzed and a second dictionary in accordance with which the other portion of the sentences than the inserted comments is analyzed, the first dictionary including an inserted comment extracting rule in accordance with which the inserted comments are extracted and an inserted comment analysis grammar in accordance with which the inserted comments which and extracted are analyzed; (f) a translation portion (5) coupled to the edit control portion for executing the translation processing in accordance with control signals from the edit control unit such that the inserted comments are extracted in accordance with the inserted comment extracting rule, the inserted comments, which are extracted, are analyzed in accordance with the inserted comment analysis grammar, the other portion is analyzed, and an analysis of the inserted comment and an analysis of the other portion are combined to obtain an analysis of the overall sentences; (g) a display (8) having display control portion (7), for producing translated sentences in the second language in accordance with the analysis of the sentences obtained by the translation portion (5) so as to display the inserted comments translated to the second language in a distinguishable manner. The display control portion is constructed to add a symbol for showing the inserted comment to each of the translated inserted comment and to display the translated sentences including the inserted comment with the symbol.

These and other objects, features and advantages of the present invention will be more apparent from the following description of a preferred embodiment, taken in conjunction with the accompanying drawings.

BRIEF DESCRIPTION OF DRAWINGS

FIG. 10 is an explanatory drawing of the analysis of the other portion in the sentences than the inserted comment, FIG. 11 is an explanatory drawing of the analysis of the overall sentences, and FIG. 12 shows an output display of the translation of the sentences including the inserted comment.

DESCRIPTION OF THE PREFERRED EMBODIMENT

Figure 1:
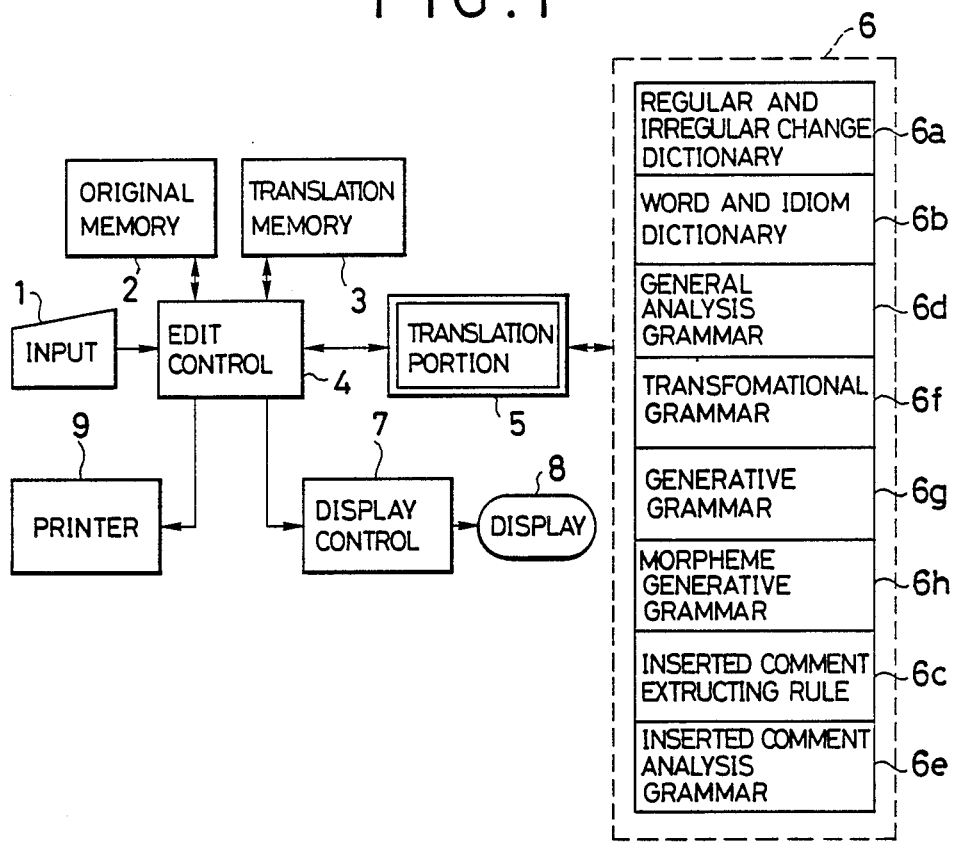
FIG. 1 is a construction of an overall machine translation system according to one embodiment of the present invention.

Referring to FIG. 1, the machine translation system according to the present invention comprises an input portion 1 which may be a keyboard, an original memory portion 2 for storing sentences of the original written in a first language inputted by the keyboard, a translation memory portion 3 for storing the translated sentences in a second language corresponding to the input original in the first language, ar edition control portion 4 for controlling the entire system, a translation portion 5 for performing, translation processing, translation dictionary units 6 including the general purpose and nomenclature dictionaries, which contains various rules of grammar as well as words, idioms, and expressions for use in the translation processing, a display control portion 7 for controlling the display of various sentences including the original and its translated sentences, a display 8, and a printer portion 9 for printing the original sentences and their translated sentences displayed on the display 8 and for outputting the translated sentences. In this machine translation system, if an English-Japanese translation should be performed, the first language is English and the second language is Japanese.

Figure 2:
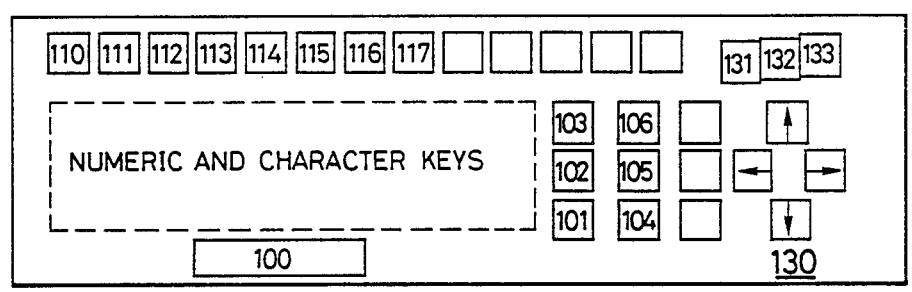
FIG. 2 is the arrangement of various keys provided on the input means of the system of FIG. 1.

FIG. 2 shows one example of the arrangement of keys of a key board of the input portion 1, according to the present invention. The key board comprises the following different keys in addition to the normal alphanumeric keys;

a key 100 indicates a translation instruction key, keys 101 through 106 indicate edit keys, keys 110, through 117 indicate function keys, keys 130 through 134 and the remaining keys indicate cursor keys.

Figure 3:
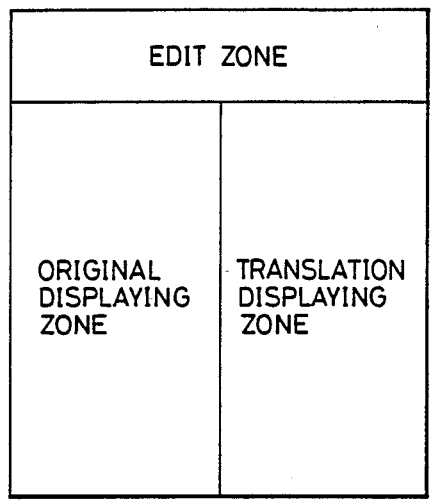
FIG. 3 is one example of the lay-out of the display zones in the display surface of the display means.

FIG. 3 shows one example of lay-out of the display surface of the display portion 8, where the original sentences in the first language are to be displayed on the left side zone of the display while the translated sentences in the second language are to be displayed on the right side zone of the display corresponding to the original sentences, under the edit zone located in the upper portion of the display, on which information necessary for performing different editions is displayed.

Figure 4:
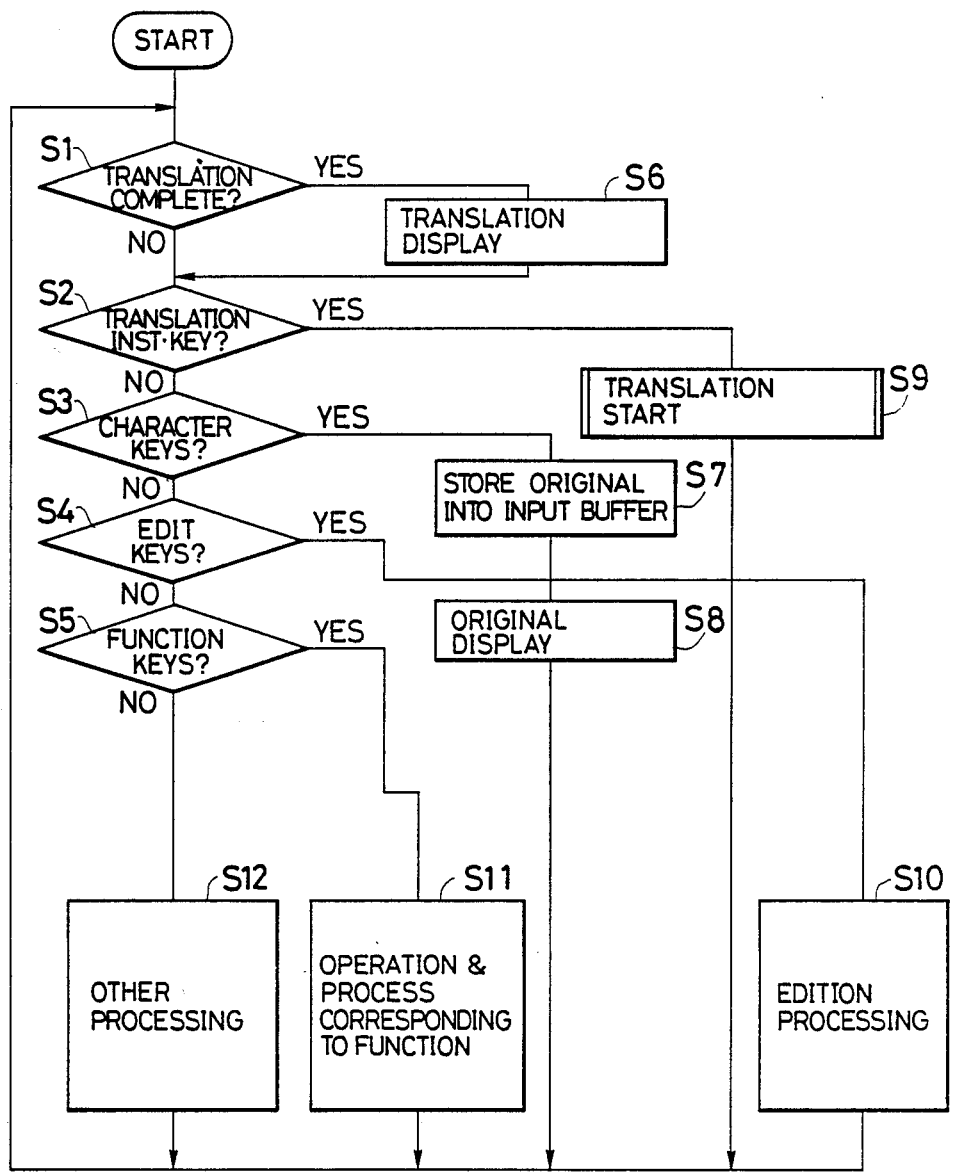
FIG. 4 is a control flow chart of the edit control operation and processing performed by the edit control means.

FIG. 4 shows a control flow chart of a interactive translation processing performed by the edit control portion 4. In the interactive translation processing, an operator can conveniently carry out the editing work of the translated sentences and the original sentences.

In the control flow chart, the edit control portion 4 monitors if any input of information has been done by the key board of the input portion 1 or any translation completion signal from the translation portion 5 has been received in steps $S_1$ to $S_5$ and the result of the monitoring is YES, i.e., any key input has been provided, the corresponding operation is carried out.

When the operator operates any function key, this condition is detected in step $S_5$ and the operation corresponding to the function keys is carried out in step $S_{11}$.

When the operator operates any edit key, this condition is detected in step $S_4$ and the edit operation corresponding to the edit keys is carried out in step $S_{10}$.

When the operator operates the cursor key 130 or any of other control keys the corresponding operation for moving the cursor and other processing are performed in step $S_4$ in accordance with the operation of the keys.

When the original sentences are input by the operator by the operation of character keys, this condition is detected in step $S_3$, the characters corresponding to the operation of particular keys are stored in an input buffer (not shown) within the edit control portion 4 successively in step $S_7$. These original sentences are displayed on the original display zone on the display portion 8 through the display control portion 7 in step $S_8$.

When the operator operates the translation instruction key 100 when entry of one sentence for instance has been completed, this condition is detected in step $S_2$ and the original sentence stored in the input buffer is applied to the translation portion 5 by the edit control portion 4, so as to start the translation processing in step $S_9$. In this case, when it is necessary to perform any editions such as correction, insertion, deletion of word or words or phrase during the entry cf the original, it can be carried out by the operation of the correction key 101, the insertion key 102, or the deletion key 103 after moving the cursor to a desired edit position by the operation of the cursor keys 130.

More particularly, after start of the operation, if a first determination is carried out in step $S_1$ translation is completed. If the result of the determination is NO, the operation now moves to step $S_2$ where a decision is made if the translation instruction key 100 is operated. If the result of the decision in step $S_2$ is YES, the operation goes to step $S_9$ where translation is started. However, if the result of the decision in step $S_2$ is NO, the operation goes to step $S_3$ where another decision is made if the character keys, i.e., alphanumeris keys are operated. If the result of this decision is YES, the operation moves to step $S_7$ where the original is stored in the input buffer not shown. On the other hand, if the result of the decision in step $S_3$ is NO, the operation now moves to step $S_4$ where another decision is made if any of the edit keys 101 to 106 is operated. If the result of the decision is YES, the operation now goes to step $S_{10}$ where the edition processing is carried out, corresponding to each key operated with respect to a particular word or phrase which is being indicated by the cursor.

For instance, when the insertion key 102 is operated in this case, any desired character is inserted before the position of the cursor while when the deletion key 103 is operated, a character or a series of characters indicated by the cursor is deleted. In the same manner, when the movement key 104 is operated, characters indicated by the cursor are moved from one place to the other. When the cancel key 105 is operated, the effect of the operation of any of the keys 101, 102, 103 is cancelled. When a modification relation candidate key 105 is operated, modification candidates for the word or phrase indicated by the cursor are indicated.

Returning to step $S_4$, if the result of the decision in step $S_4$ is NO, the operation now moves to step $S_5$ where another decision is made if any of the function keys 110 to 117 is operated. If the result of the decision is YES, the operation goes to step $S_{11}$ where various processings corresponding to any of the function keys operated are carried out. For instance, when the translation word display key 110 is operated, the translated candidate words are displayed on the display portion 8. When the dictionary display key 111 is operated, a partial content of either the general purpose dictionary and the nomenclature dictionary corresponding to the words or phrase of the original or translation results can be indicated on the display portion 8.

When the dictionary registration key 112 is operated, new words or idioms can be registered. When the dictionary deletion key 113 is operated, certain words or idioms which have been registered by key 112 can be cancelled or deleted. When the partial translation key 114 is operated, a partial translation can be displayed on the display portion 8, for correction, for instance.

The cursor keys consists of keys 130 for moving the cursor in the upward, downward, right and left directions, respectively, the unit change key 131 for changing the unit for moving the cursor, the display zone movement keys 132 for moving the cursor between the display zones, the enlargement key 133 for enlarging the size of the cursor into word unit, and reduction key 134 for reducing the size of the cursor into a character unit.

Now, returning to step $S_1$, if the result of the decision in step $S_1$ is YES, the operation moves to step $S_6$ where the edit control portion 4 supplies translated sentence candidates and auxiliary information obtained from the translation portion 5 to the display control portion 7, so as to display the best translated sentences among the candidates.

The display control portion 7 indicates the translated sentence candidates in the translation display zone corresponding to the that of the original which is displayed on the eft side, as well as displaying them with high brightness when the auxiliary information exists, so that the operator can well identify the translated sentences.

In the manner as described, the operator of the machine translation system according to the present invention can obtain the translate sentences dialoguing with the system while conveniently carrying out the edition processing of the translated sentences.

Figure 5:
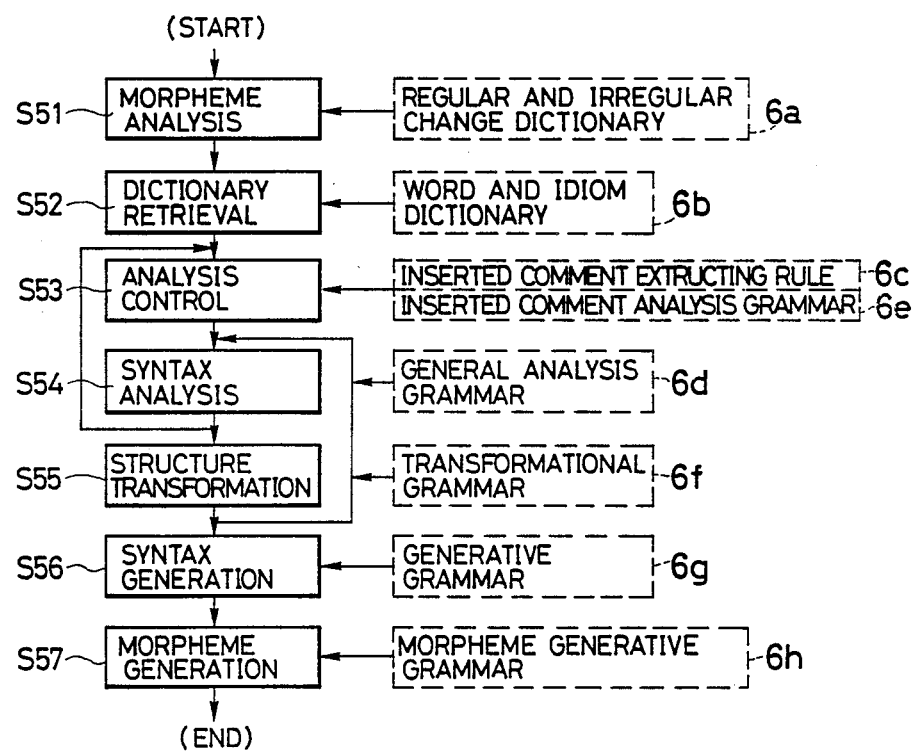
FIG. 5 shows a control flow chart of the translation processing performed by the translation means.

FIG. 5 shows a control flow chart of the translation processing in the translation portion 5.

After start of the operation, in the morpheme analysis section $S_{51}$, words each having inflection are transformed into each of their basic forms by use of a regular and irregular change dictionary $6a$ with respect to the input original.

In the dictionary retrieving section $S_{52}$, each of words, phrases, and idioms is retrieved from the original sentences and Parts of Speech are picked up by the use of a word and idiom dictionary $6b$.

In the analysis control section $S_{53}$, each candidate of translation is applied to a syntax analysis section $S_{54}$. As described latter, inserted comments are extracted in accordance with an inserted comment extracting rule $6c$ and applied to the syntax analysis section $S_{54}$.

In the syntax analysis section $S_{54}$, the syntax of each candidate of translation is analyzed by using a general analysis grammar $6d$ and the inserted comment of candidate is analyzed by using an inserted comment analysis grammar $6e$ if the analysis is not successful, the operation returns to the analysis control section $S_{53}$.

In the structure transformation section $S_{55}$, the structure of the first language, i.e., English language in this case, is transformed into the second language, i.e., Japanese language in this case, by using a transformational grammar $6f$. If the transformation is not successful, the operation now returns to the syntax analysis section.

In the syntax generation section $S_{56}$, the word order or word sequence of the second language, i.e., the Japanese language is determined from the structure of the Japanese language in accordance with a generative grammar $6g$ and the word order is arranged in accordance with the generative grammar.

In the morpheme generation section $S_{57}$, the ending of each word is changed by using a morpheme generative grammar $6h$, so as to complete each of the translated sentences.

Each of the above sections produces each signal to the edit control portion 4 when starting the processing thereof.

As described above, the dictionary means 6 includes a first dictionary in accordance with which the inserted comments are extracted and analyzed, a second dictionary in accordance with which the other portion than the inserted comments is analyzed, and a third dictionary in accordance with which the translation processing other than the analysis is carried out. The first dictionary includes the inserted comment extracting rule $6c$ and the inserted comment analysis grammar $6e$. The second dictionary includes the general analysis grammar $6d$. The third dictionary includes the regular and irregular change dictionary $6a$, the word and idiom dictionary $6b$, the transformational grammar $6f$, the generative grammar $6g$, and the morpheme generative grammar $6h$.

Description will now be made about an analyze processing of an english sentence having an inserted comment in the above mentioned system.

Figure 6:
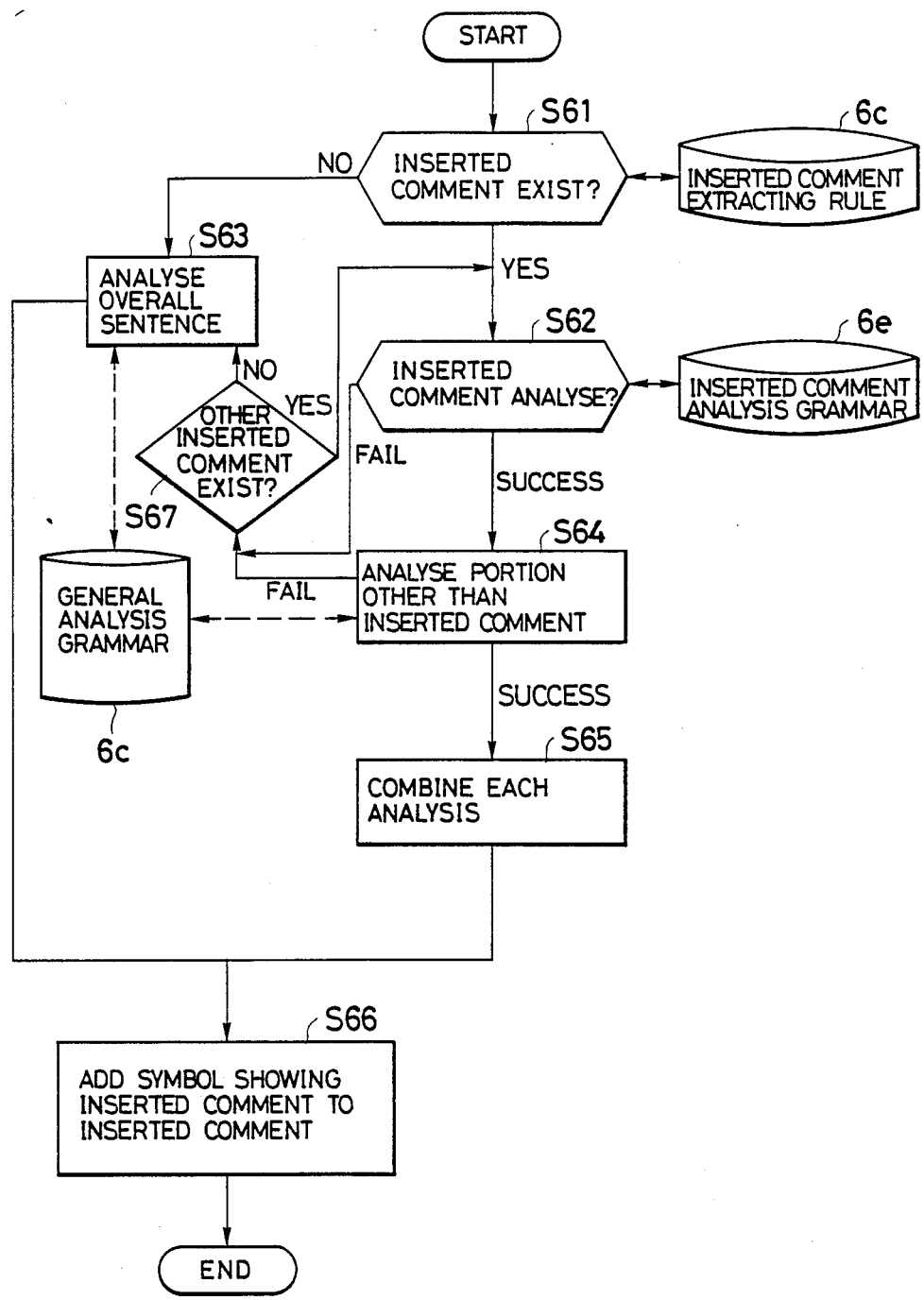
FIG. 6 shows a control flow chart of the analysis processing of the sentences having the inserted comments.

Referring to FIG. 6, the analyze processing is described when a following example of an English sentence is inputted to the system.

"The system has this mode, i.e. the burst mode, in the operation."

Figures 7, 8, 9:
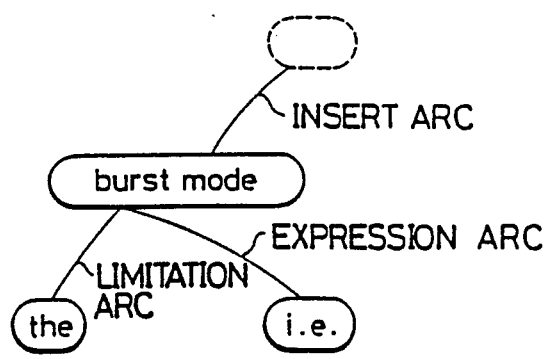
FIG. 7 shows the contents of the inserted comment extracting rule.
FIG. 8 shows the contents of the inserted comment analyzing grammar.
FIG. 9 is an explanatory drawing of the analysis of inserted comment.

In step 61, a portion which is probably an inserted comment is extracted in accordance with the inserted comment extracting rule $6c$. The inserted comment extracting rule $6c$ as shown in FIG. 7 is stored in the translation dictionary means 6. The rule includes prescribed patterns for defining the inserted comments and addresses for inserted comment analysis grammars $6e$ corresponding to the inserted comments, respectively. As shown in FIG. 8, the inserted comment analysis grammars $6e$ are stored so as to correspond to the inserted comments such as a noun phrase, a preposition phrase, a verb phrase, an adverb phrase, and etc. After the portion which is probably the inserted comments, namely, "i.e. the burst mode" in this example is extracted in accordance with a rule F shown in FIG. 7, the portion is analyzed by a grammar A shown in FIG. 8 (step 62). If the analysis is accomplished as shown in FIG. 9, the portion is formally judged as the inserted comment. In contrast, if the analysis is not accomplished, the judgement that it is not the inserted comment is issued. In step 67, if the other inserted comment is extracted, the process goes to step 62 again. If the other inserted comment is not extracted, the process proceeds to step 63, and the overall sentence is analyzed in normally process in step 63. On the judgement that the portion is the inserted comment, the portion is extracted from the sentence and the remaining, namely, "The system has this mode in the operation." is analyzed by the general analysis grammar $6d$ (step 64). As a result, an analysis as shown in FIG. 10 is obtained. If the analysis is not accomplished in step 64, the process proceeds to step 67. In step 67, if the other inserted comment is not extracted, the overall sentence is analyzed in normally process. In step 64, if the analysis is accomplished, the analysis shown in FIG. 9 and the analysis shown in FIG. 10 are combined together to obtain an analysis of the overall sentence shown in FIG. 11 in step 65.

In a step for generating a translation in accordance with the analysis shown in FIG. 12, a symbol for showing the inserted comment, for example "(,)" is added to the translated portion corresponding to the inserted comment. Namely, in FIG. 11, a portion below an insert arc are judged as the inserted comments and the symbol "(,)" is added to the both sides of the nodes to obtain the translation as shown in FIG. 12 (step 66 in FIG. 6).

In this embodiment, the symbol "(,)" is used as a symbol for showing the inserted comments, however, it is not limited, for example, symbols such as " ", "- -", "--- ---", ". .", " " may be applicable in the present invention.

In summary, in accordance with the present invention, a sentence of a first language including inserted comments is automatically analyzed in accordance with an inserted comment extracting rule and an inserted comment analysis grammar. Therefore, the operator does not need to designate the inserted comments one by one in the sentence in the pre-edit process. Moreover, a symbol for showing the inserted portion is added to a translated inserted comments, therefore, it brings an easy discrimination of the translated inserted comments to the operator.

Various modifications will become possible for those skilled in the art after receiving the teachings of the present disclosure without departing from the scope thereof.

What is claimed is:

1. A machine translation system for translating sentences with inserted comments of a first language into a second language, which comprises:
   (a) input means for entry of the sentences of the first language into the system;
   (b) dictionary means for storing information for use in translation processing, said dictionary means comprising;
   a first dictionary including an inserted comment extracting rule in accordance with which the inserted comments are extracted, and an inserted comment analysis grammar in accordance with which the inserted comments being extracted are analyzed, and
   a second dictionary in accordance with which a remaining portion of the sentences other than the inserted comments is analyzed;
   (c) translation means comprising,
   means for extracting the inserted comments in accordance with the inserted comment extracting rule,
   means for analyzing the remaining portion in accordance with the second dictionary to obtain an analysis of the remaining portion, and
   means for combining the analysis of the inserted comment and the analysis of the remaining portion to obtain an analysis of the sentences as a whole; and
   (d) output means for producing translated sentences in the second language in accordance with the analysis of the sentences obtained by said combining means so as to display the inserted comments translated in the second language in a distinguishable manner.

2. The machine translation system as claimed in claim 1, wherein said output means is constructed to add a symbol for showing the inserted comment to each of the translated inserted comment and to display the translated sentences including the inserted comment with the symbol.

3. The machine translation system as claimed in claim 1, wherein said dictionary means further comprises a third dictionary in accordance with which a translation processing other than the analyses of the inserted comment and the remaining portion is carried out.

4. The machine translation system as claimed in claim 3, wherein said second dictionary includes a general analysis grammar and said third dictionary includes a regular and irregular change dictionary, a word and idiom dictionary, a transformational grammar, a generative grammar, and a morpheme generative grammar.

5. The machine translation system as claimed in claim 1, wherein the first language is English and the second language is Japanese.

6. A machine translation system for translating sentences with inserted comments of a first language into a second language, which comprises:
   (a) input means having function keys, edit keys, and cursor keys for entry of the sentences of the first language and for performing various operations for translation thereon;
   (b) a first memory for storing sentences written in the first language so as to accommodate analysis of the sentences;
   (c) a second memory for storing translated sentences in the second language as a translation corresponding to the input sentences in the first language;
   (d) edit control means for controlling an editing operation of the system;
   (e) dictionary means having a first dictionary in accordance with which the inserted comments are extracted and analyzed and a second dictionary in accordance with which a remaining portion of the sentences other than the inserted comments is analyzed, the first dictionary including an inserted comment extracting rule in accordance with which the inserted comments are extracted, and an inserted comment analysis grammar in accordance with which the inserted comments being extracted are analyzed;
   (f) translation means coupled to said edit control means for executing translation processing in accordance with control signals from said edit control means such that the inserted comments are extracted in accordance with the inserted comment extracting rule, the inserted comments, which are extracted, are analyzed in accordance with the inserted comment analysis grammar, the remaining portion is analyzed in accordance with the second dictionary, and an analysis of the inserted comment and an analysis of the remaining portion are combined to obtain an analysis of the sentences as a whole; and
   (g) display means having display control means for producing translated sentences in the second language in accordance with the analysis of the sentences obtained by said translation means so as to display the inserted comments translated to the second language in a distinguishable manner.

7. The machine translation system as claimed in claim 6, wherein said display control means is constructed to add a symbol for showing the inserted comment to each of the translated inserted comment and to display the translated sentences including the inserted comment with the symbol.

8. The machine translation system as claimed in claim 6, wherein said dictionary means further comprises a third dictionary in accordance with which a translation processing other than the analyses of the inserted comment and the remaining portion is carried out.

9. The machine translation system as claimed in claim 8, wherein said second dictionary includes a general analysis grammar and said third dictionary includes a regular and irregular change dictionary, a word and idiom dictionary, a transformational grammar, a generative grammar, and a morpheme generative grammar.

10. A machine translation method of translating sentences with inserted comments of a first language into a second language, which comprises the steps of:
 (a) inputting the sentences in the first language into the system;
 (b) extracting the inserted comments in accordance with an inserted comment extracting rule;
 (c) analyzing the inserted comments, which are extracted, in accordance with the inserted comment analysis grammar;
 (d) analyzing the other portion in the sentences than the inserted comment;
 (e) combining an analysis of the inserted comment and an analysis of the other portion to obtain an analysis of the sentences as a whole;
 (f) producing the translated sentences in the second language in accordance with the analysis of the sentences which is combined;
 (g) adding a symbol for showing the inserted comment to each of the translated inserted comment; and
 (h) displaying the translated sentences including the inserted comment with the symbol.

11. The machine translation method as claimed in claim 10, wherein said first language is English and said second language is Japanese.

12. A language translator system comprising:
 an input means for inputting a sentence to be translated;
 an extracting means for analyzing contents of said sentence and extracting a candidate for an inserted comment by comparing said contents of said sentence with definitions of candidates which have been prepared particularly for said system;
 a first translation means for carrying out a translation of a remaining portion of said sentence other than the extracted candidate;
 a second translation means adapted to translate the inserted comment in accordance with said definitions; and
 a recombination means for inserting the translation of the inserted comment in the translation of the remaining portion of said sentence at a location corresponding to an extracted location of the inserted comment in the sentence to be translated.

13. A language translator system comprising:
 an input means through which sentences of a first language are introduced to said system;
 a translation means for translating said sentences from said first language into a second language; and
 an output means for outputting translations of said sentences,
 wherein said translation means consists of a first translator adapted to analyze inserted comments which are extracted from the inputted first language sentence in accordance with definitions of comments particularly provided for said translated means, and a second translator adapted to analyze remaining portions of the inputted sentences from which said inserted comments are extracted.

14. The system of claim 13, wherein the translation of said comment is inserted in a translation of said remaining portion after a word of the translation corresponding to a word of the inputted first language sentence prior to the extracted comment.

15. The system of claim 13, wherein the comments defined are marked off by a pair of marks such as punctuation or dashed marks.

16. The system of claim 15, wherein the translation of the comment marked off by said marks is inserted in the translation of the remaining portion with marks enclosing a translation of the comment.

17. A method for translation between source and target natural languages using a programmable computer system, comprising the steps of:
 storing in a memory of the computer system a source text to be translated;
 comparing the source text with rules which have been predetermined in the computer system to indicate that the text includes a potential inserted comment;
 extracting the potential inserted comment from the text if said comparing step indicates the text may conform to one of the rules;
 attempting translation of the potential inserted comment; and
 translating the text including the potential inserted comment, when the translation of the potential inserted comment fails, or translating, when the translation of the potential inserted comment succeeds, a remainder of the text excluding the potential inserted comment and inserting the translation of the potential inserted comment into the translation of the remainder of the text.

* * * * *